(12) United States Patent
Weiers

(10) Patent No.: US 11,877,244 B2
(45) Date of Patent: *Jan. 16, 2024

(54) COMMUNICATION DEVICE AND SYSTEM WITH GROUND POTENTIAL DIFFERENCE COMPENSATION

(71) Applicant: Microchip Technology Incorporated, Chandler, AZ (US)

(72) Inventor: Stefan Weiers, Heidelberg (DE)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,608

(22) Filed: Dec. 21, 2022

(65) Prior Publication Data

US 2023/0123416 A1    Apr. 20, 2023

Related U.S. Application Data

(63) Continuation of application No. 16/555,181, filed on Aug. 29, 2019, now Pat. No. 11,564,172.

(Continued)

(51) Int. Cl.
*H02M 1/42* (2007.01)
*H04W 52/02* (2009.01)
(Continued)

(52) U.S. Cl.
CPC ........ *H04W 52/0277* (2013.01); *G06F 1/266* (2013.01); *G06F 3/0662* (2013.01); *H02M 1/42* (2013.01); *H02M 1/0016* (2021.05)

(58) Field of Classification Search
CPC ... G06F 1/266; G06F 1/28; G06F 1/30; G06F 3/0662; H01M 10/4257; H02J 1/08;
(Continued)

(56) References Cited

U.S. PATENT DOCUMENTS

2013/0191566 A1   7/2013   Kaestner ...................... 710/104
2013/0285641 A1  10/2013   Mkrtchyan et al. ............ 324/98
(Continued)

FOREIGN PATENT DOCUMENTS

CN    108539808 A    9/2018    ............... H02J 7/00
JP    2016091173 A    5/2016    ............... G06F 1/28

OTHER PUBLICATIONS

Various Authors, "On-the-Go and Embedded Host Supplement to the USB Revision 3.0 Specification, Revision 1.1," USB Implementers Forum, Inc., URL: https://www.usb.org/document-library/go-and-embedded-host-supplement-usb-revision-30-specification-revision-11, 11 pages, May 10, 2012.

(Continued)

Primary Examiner — Jaweed A Abbaszadeh
Assistant Examiner — Brian J Corcoran
(74) Attorney, Agent, or Firm — SLAYDEN GRUBERT BEARD PLLC

(57) ABSTRACT

A communication device for connection with a power source and a host device is provided. The communication device comprises a device controller and a converter circuit. The device controller is adapted for data communication with the host device and the converter circuit is configured to provide a virtual device ground at least to the device controller, so as to compensate a ground potential difference between the host device and the communication device.

18 Claims, 4 Drawing Sheets

Related U.S. Application Data

(60) Provisional application No. 62/817,124, filed on Mar. 12, 2019.

(51) Int. Cl.
    *G06F 1/26*     (2006.01)
    *G06F 3/06*     (2006.01)
    *H02M 1/00*     (2006.01)

(58) Field of Classification Search
    CPC .... H02M 1/0016; H02M 1/007; H02M 1/008; H02M 1/42; H02M 3/156; H04W 52/0277; Y02D 30/70; Y02E 60/10
    See application file for complete search history.

(56) References Cited

U.S. PATENT DOCUMENTS

| | | |
|---|---|---|
| 2015/0022174 A1 | 1/2015 | Nikitin .......................... 323/282 |
| 2015/0357902 A1 | 12/2015 | Hung et al. ..................... 363/45 |
| 2016/0378154 A1 | 12/2016 | Srivastava .................... 713/300 |
| 2017/0033688 A1 | 2/2017 | Nikitin .......................... 323/282 |
| 2017/0052578 A1 | 2/2017 | Agarwal et al. ............. 710/313 |
| 2018/0254648 A1 | 9/2018 | Harju |
| 2018/0276172 A1 | 9/2018 | Chen et al. |
| 2019/0386846 A1 | 12/2019 | Yamada |

OTHER PUBLICATIONS

International Search Report and Written Opinion, Application No. PCT/US2019/049849, 12 pages, dated Oct. 18, 2019.
Chinese Office Action, Application No. 201980093879.X, 16 pages, dated Apr. 23, 2023.

FIG. 1 – Prior Art

COMMUNICATION DEVICE AND SYSTEM WITH GROUND POTENTIAL DIFFERENCE COMPENSATION

CROSS-REFERENCE TO RELATED APPLICATION

This application claims priority to U.S. Provisional Patent Application 62/817,124, filed on Mar. 12, 2019 with the United States Patent and Trademark Office. The contents of this application are incorporated herein for all purposes.

TECHNICAL FIELD

The present disclosure relates to the field of communication and in particular to a communication device configured for connection with a power source and a host device.

BACKGROUND

A multitude of communication systems and protocols are being used today. Some systems are designed so that in addition to communication, it is possible to transfer substantial amounts of power between two devices. A notable such system is defined under the Universal Serial Bus ("USB") standards. USB is ubiquitous today for conductor-based communication links, but also for power transfer applications, such as mobile device charging.

Since its first version, USB has evolved from a data interface capable of supplying limited power in the range of 500 mA to a system, which as a main application, allows the transfer of substantial electrical power, while maintaining data communication functionality. Many of today's computing or telecommunication devices charge, or get their power, from USB ports contained in laptops, cars, aircraft, trains, or even USB wall sockets. USB has become the main power socket for devices such as computers, tablets, smart, phones, cell phones, MP3 players, and other hand-held devices.

The USB Power Delivery (PD) specification Rev. 2.0 available from the USB Implementers Forum, Inc., Beaverton, Oreg., enhances the functionality of USB by providing a more flexible power delivery along with data communication over a single cable. Its aim is to operate with and build on the existing USB ecosystem.

With USB Power Delivery (USB-PD), USB-PD capable devices draw significantly higher currents from the power source than previous USB devices due to an increased power budget per port. While previous specifications allowed a maximum power draw of 15 W per port, the USB-PD allows up to 100 W of electrical power per port. This increase is quite significant.

SUMMARY

The present inventor has ascertained that in some applications, a voltage drop on a ground connection between two devices due to the presence of high currents, such as for example when charging over USB-PD, can cause a significant ground shift between the two devices. In some instances, the ground shift can hinder proper communication, or in a worst case scenario, make communication between the two devices impossible.

A known method to avoid this issue is to minimize the ohmic resistance by using larger copper wire diameters or shorter cable lengths. This method however is costly and limits wiring possibilities.

Thus, a need exists to improve a corresponding communication system and communication device to allow proper communication irrespective of any power transfer that may cause a ground shift.

This need is addressed by a communication device, a communication system with a communication device, and a method of communication according to the independent claims. The dependent claims and the following specification discuss embodiments of the invention.

According to one aspect of the invention, a communication device is provided. The communication device is configured for connection with a power source and a host device and comprises at least a device controller, adapted for data communication with the host device. The communication device further comprises a converter circuit, which converter circuit is configured to provide a virtual device ground at least to the device controller to compensate a ground potential difference between the host device and the communication device.

An underlying idea of the above aspect is to compensate any eventual ground shift between the host device and the communication device using a virtual ground on the side of the communication device. This avoids the need to use larger copper wire diameters or shorter cable lengths, which allows a significantly increased flexibility. In addition, the provision of the virtual ground on the side of the communication device may in some embodiments be independent of the implementation of the host device, which may provide cost benefits.

BRIEF DESCRIPTION OF THE DRAWINGS

The above and other objects, features, and advantages of the current invention will become apparent from the following discussion of various embodiments. In the FIGS.

DETAILED DESCRIPTION

Figure 1:
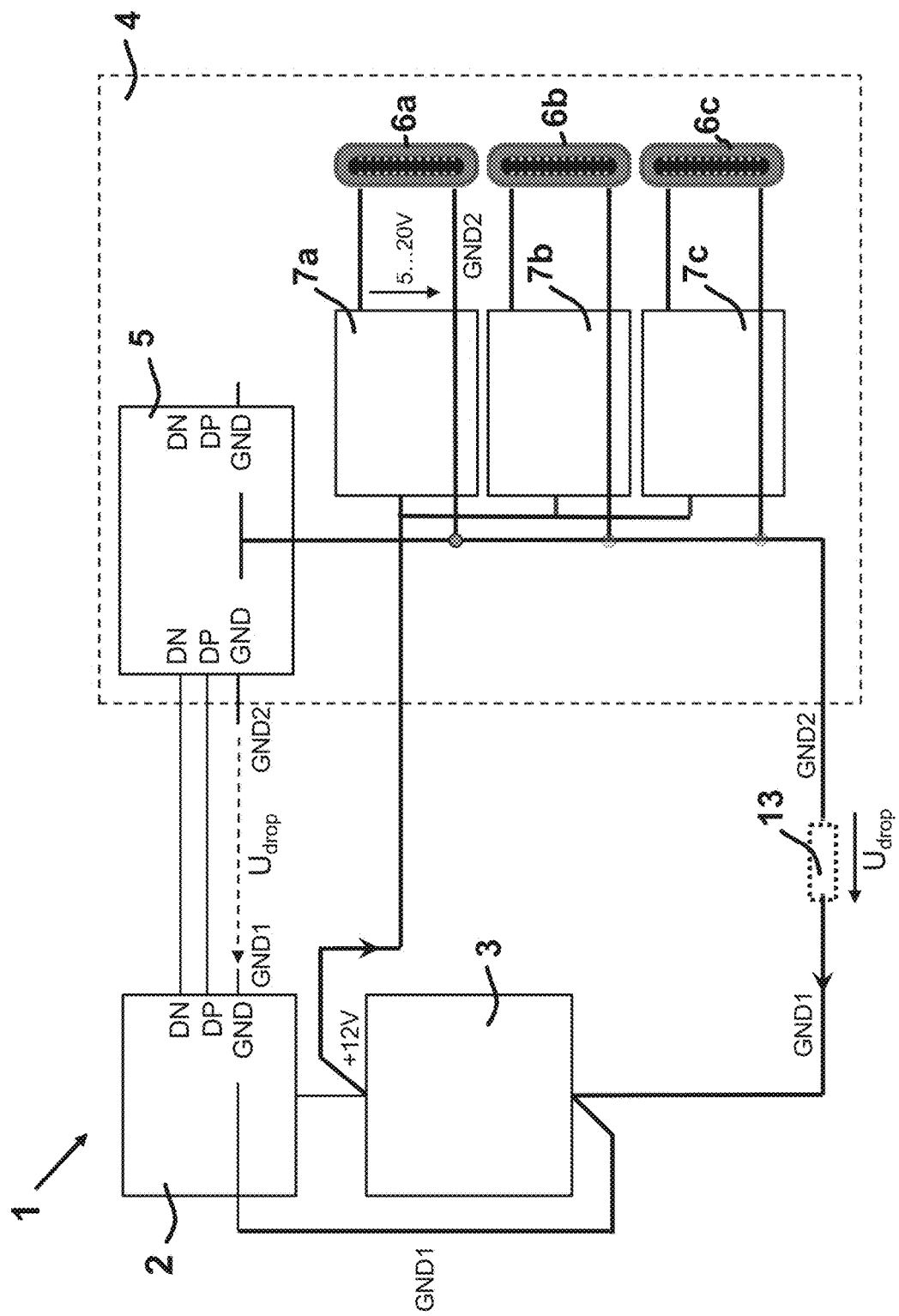
FIG. 1 shows an exemplary block diagram of a USB communication system.

Technical features described in this application can be used to construct various embodiments of communication devices and communication systems. Some embodiments of the invention are discussed so as to enable one skilled in the art to make and use the invention.

In one aspect, a communication device is provided. The communication device may be used in a communication system and is configured for connection with a power source and a host device. The communication device comprises at least a device controller, adapted for data communication with the host device. The communication device further comprises a converter circuit, which converter circuit is configured to provide a virtual device ground at least to the device controller to compensate a ground potential difference between the host device and the communication device.

As will be apparent from the preceding, the present aspect provides a virtual device ground, i.e., a local ground at least for the device controller. The potential of the virtual device ground may be set by the converter circuit to compensate for any eventual potential difference, i.e., ground shift between the communication device and the host device, resulting in a more stable connection between the devices to enable improved communication.

The communication device may be of any suitable type. In some embodiments, the communication device may be adapted for use with one or more serial communication protocols, such as one or more of USB, Thunderbolt, CAN bus, FireWire, and Ethernet.

For example, the communication device may be USB device of any device class or a USB hub. In the aforementioned cases, the device controller in some embodiments may be a USB device function controller or a USB hub controller. In some embodiments, the communication device is configured to communicate with the host device using the USB 2.0 protocol or a higher protocol version. In some embodiments, the communication device is a "Breakout Box" or a "Media Box", e.g., for vehicles. In some embodiments, the host device is a head unit.

The communication device of the present aspect is configured for connection to a power source and a host device. In some embodiments, the power source and the host device are integrated with each other. In alternative embodiments, the power source and the host device are separated from each other. In some embodiments, the power source provides an electrical operating power of at least 15 W to the communication device. The operating power may be used in some embodiments for operational needs of the communication device, the charging of a battery of the communication device, and/or for powering further downstream devices, connected to one or more downstream ports of the communication device. The host device may be of any suitable type for data communication with the communication device, e.g., digital communication. Although the terms 'host device' and 'USB device' are used in line with the usual terminology of the Universal Serial Bus standard, it is noted that the logical functionality may depart from the USB terminology in some embodiments. For example, the communication device may have the functionality of a USB host and the host device may have the functionality of USB device.

As discussed in the preceding, the communication device of this aspect comprises the converter circuit to provide a virtual device ground at least to the device controller to compensate for a ground shift between the host device and the communication device. In other words, the converter circuit may compensate a voltage drop on a ground connection between the host device and the communication device due to line impedance. In some embodiments, the converter circuit is provided as part of the device which consumes power.

The converter circuit may be of any suitable type. In some embodiments, the converter circuit comprises a switched-mode power supply. In some embodiments, the converter circuit comprises one of a buck converter, a boost converter, a buck/boost converter, and any other suitable converter.

In some embodiments, the converter circuit is a buck converter with positive output voltage. This may be more effective in terms of cost and size than generating negative voltages. In some embodiments, the converter circuit is used to shift its internal ground level downwards.

In some embodiments, the converter comprises a sense input (sense line) for connection to a ground potential (level) of the host device and/or the power source. In the present context, the term 'ground potential of the host' is understood as the electrical potential of the signal ground on the side of the host device, i.e., the signal ground, used for data communication with the communication device. In some embodiments, the converter circuit comprises a compensator to control the virtual device ground. The compensator may be of any suitable type of digital or analog circuitry. For example, the compensator may be a microcontroller with suitable programming. In some embodiments, the compensator is a digital 3P3Z compensator. In some embodiments, the compensator is connected with the sense input to determine the ground potential of the host device. In some embodiments, the compensator is connected with a switched-mode power supply, such as for example a buck converter, of the converter circuit, to control the virtual device ground.

In some embodiments, the compensator is configured to, using the sense input, control the virtual device ground, so that a difference between the virtual device ground and the ground potential of the host device is reduced. Alternatively, it is possible to determine the ground potential at the power source, in particular if the impedance of a ground connection between power source and the host device is so small that the resulting voltage drop can be neglected compared to a maximum ground shift threshold of 125 mV, as discussed in more detail in the following.

In some embodiments, the compensator is configured to control the virtual device ground to match the ground level of the host device (+−125 mV).

The compensator in some embodiments may be configured to control the converter circuit based on a pre-determined impedance of the signal ground between host device and communication device. The pre-determined impedance may for example be determined during assembly and then programmed into a memory of the compensator. In some embodiments, the compensator is configured to determine the impedance during power-on by measurement. For example, the compensator may draw current pulses from the power source and determine changes of an internal ground potential compared with the ground potential of the host.

In some embodiments, the compensator may be configured to determine an overall power consumption of the communication device, e.g., including any connected downstream devices. In some embodiments, the compensator may include power consumption measurement circuitry. If the impedance of the ground connection and the overall power consumption of the communication device is known, the sense input, as described in the preceding, may be omitted.

In some embodiments, the communication device further comprises a second converter circuit, which second converter circuit is connected with the power source and configured to provide an internal supply voltage. The internal supply voltage in some embodiments may be provided to the device controller. Alternatively, or additionally, the internal supply voltage may be provided to further components of the communication device and/or to one or more connected downstream devices. In some embodiments, the internal supply voltage is higher than a voltage supplied by the power source to the communication device.

In some embodiments, the second converter circuit is a switched-mode power supply, such as for example, a boost converter.

In some embodiments, the second converter circuit comprises a ground terminal, which ground terminal is not connected to the virtual device ground. In other words, the ground of the second converter circuit during use is connected to the ground of the power source, which prevents the second converter circuit from loading the first converter circuit.

In some embodiments, the communication device is a USB hub. In some embodiments, the USB hub comprises one or more downstream ports. In some embodiments, the virtual device ground is provided to the one or more downstream ports.

In some embodiments, one or more of the downstream ports have an associated downstream power converter. The downstream power converter may for example be a switched-mode power supply, such as a buck converter. In some embodiments, the downstream power converter is connected to the virtual device ground.

One or more downstream ports may in some embodiments share one associated downstream power converter. Alternatively, and in some embodiments, one or more of the downstream ports each have a dedicated associated downstream power converter. In some embodiments, a dedicated downstream power converter is arranged per downstream port.

In a second aspect, a communication system with a host device and a communication device is provided. The communication device of the communication system being configured for connection with (or is connected to) the host device and a power source. The communication device comprises at least a device controller, adapted for data communication with the host device, and a converter circuit. The converter circuit is configured to provide a virtual device ground at least to the device controller to compensate a ground potential difference between the host device and the communication device.

The communication device and the host device may in some embodiments be configured as discussed in the preceding with reference to the first aspect. With respect to terms used in the explanation of the second aspect and their definitions, reference is made to the first aspect.

According to a third aspect, a method of communication in a communication system with a host device and a communication device is provided. The method of the present aspect comprises the steps of:

providing a virtual ground at least to a device controller of the communication device;

controlling the virtual ground, so that a difference of potential between the virtual device ground and a ground potential of the host device is reduced; and communicating between the host device and the communication device.

The communication device and the host device may in some embodiments be configured as discussed in the preceding with reference to the first and second aspects. With respect to terms used in the explanation of the third aspect and their definitions, reference is made to the first aspect.

It is noted that the communication device, communication system, and/or the method of communication as discussed in the preceding may in some embodiments be used in a vehicle, airplane, train or ship, without limitation. According to another aspect, a vehicle with a communication device or a communication system, as described in the preceding, is provided.

Reference will now be made to the drawings in which further embodiments are discussed and in which various elements will be given numerical designations.

Specific references to components, process steps, and other elements are not intended to be limiting. Further, it is understood that like parts bear the same or similar reference numerals when referring to alternate figures. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

The following discussion of further embodiments relates to Universal Serial Bus ("USB") applications. USB has evolved from a data interface capable of supplying limited power to a primary provider of power with a data interface. Today many devices charge or get their power from USB ports contained in laptops, cars, aircraft or even wall sockets. USB has become a ubiquitous power socket for many small devices such as cell phones, MP3 players and other handheld devices. Users need USB to fulfil their requirements not only in terms of data but also to provide power to, or charge, their devices simply, often without the need to load a driver, in order to carry out "traditional" USB functions.

The USB Power Delivery (PD) specification improves functionality of USB by providing more flexible power delivery along with data over a single cable. Its aim is to operate with, and build on, the existing USB ecosystem.

The USB-PD specification allows up to 100 W per port. USB-PD capable devices may thus draw significantly higher currents from the power source than previous USB devices (increased power budget per port: 15 W->100 W).

With USB-PD solutions providing higher power levels, the voltage drop on the ground line may become a serious issue. This invention addresses the ground shift issue between a USB host device (such as a "Head Unit" in a vehicle) and a USB communication device (such as a USB-PD capable USB "MediaBox", or USB hub, without limitation).

When the USB communication device draws power, its internal ground is shifted upwards due to the voltage drop on the ground wire between the power source and the USB communication device. If this ground shift exceeds a threshold of 125 mV, communication between the host device, which typically shares ground with the power source, and the communication device will be disconnected.

In some embodiments, a virtual ground is employed to solve the issue of a disconnection. This solution is less complex and easier to implement then using an alternative physical layer or tunneling data via a different protocol. The solution has a cost advantage compared to a modified cable harness (more copper) and saves weight which is desired in mobile applications (automotive, train, ship, airplane).

FIG. 1 shows an exemplary block diagram of a communication system 1, i.e., in this example a USB 3.x system, arranged in a vehicle (not shown). A host device 2 in the form of a "head unit" is connected with a communication device 4, i.e., in the example of FIG. 1, in the form of a "USB breakout box". The communication device 4 comprises a device controller 5, which in the shown setup provides the functionality of a USB hub and which allows for connection to one or more further USB devices (not shown), such as a smart phone, tablet, or laptop, through downstream ports 6a-6c.

The communication device 4 allows for operation in accordance with the USB-PD specification and provides an operating power of up to 100 W each to the downstream ports 6a-6c. To allow this, the communication device 4 according to the example of FIG. 1 is connected to the vehicle's power source, i.e., herein a 12V battery 3, and comprises three buck/boost converters 7a-7c, associated with the downstream ports 6a-6c. The buck/boost converters 7a-7c are arranged to provide voltages of between 5V and 20V to the downstream ports 6a-6c according to the voltage, requested by a USB device (not shown), when connected to a respective downstream port 6a-6c.

As will be apparent, the ground wire connection 13 between the communication device 4 and the host device 2 and its cable resistance will inevitably cause a voltage drop $U_{drop}$. Accordingly, the ground potential of line GND1 at the host device 2, and at the return of battery 3, will not match the ground potential of line GND2 of the communication device 4. It is noted that the internal ground connection of the communication device 4 and the ground connection between battery 3 and host device 2 are considered to be ideal, i.e., having a negligible impedance only. Accordingly, $U_{drop}$ is also present between the GND pin of the head unit 2 and the GND pin of the device controller 5, as shown in FIG. 1. The embodiments herein are equally capable of handling a voltage drop on the ground wire connection between battery 3 and host device 2.

The voltage drop $U_{drop}$ will increase with the power drawn from the battery 3 during operation, i.e., when further USB devices are connected to the downstream ports 6a-6c.

If the voltage drop between the host-side ground, i.e., GND1 and the ground GND2 at the device-side is higher than 125 mV, the connection between the host device 2 and the communication device 4 may be disconnected in line with the requirements of the USB Specification Revision 2.0, Section 7.2.2. This situation may arise in particular when significant power is drawn at the downstream ports 6a-6c.

Figure 2:
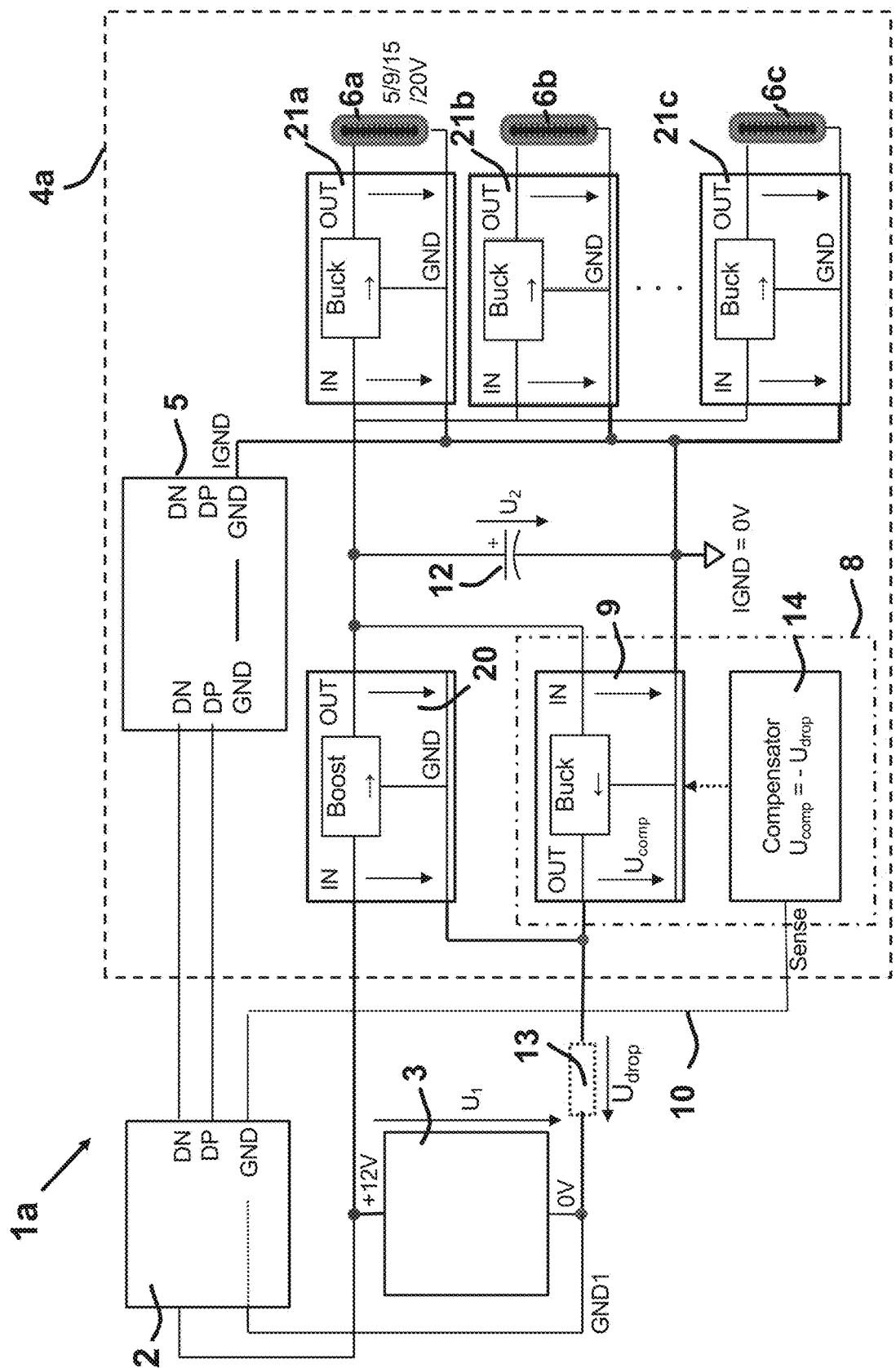
FIG. 2 shows an exemplary block diagram of an embodiment of a communication system and a communication device.

FIG. 2 shows an exemplary block diagram of an embodiment of a communication system 1a and a communication device 4a. In contrast to the setup of FIG. 1, the device controller 5 in this embodiment is connected to a virtual device ground IGND of the communication device 4a. The virtual device ground IGND is provided by a converter circuit 8, which in the present embodiment, comprises a switched-mode power supply, namely a buck converter 9 and a compensator 14.

The communication device 4a of FIG. 2 uses the converter circuit 8 to set the potential of IGND to be approximately equal to the potential of GND1 independent of the voltage drop $U_{drop}$. The compensator 14 is connected with a sense line 10 to the electric potential of GND1, which provides a particularly beneficial dynamic behavior. In the present embodiment, compensator 14 is a digital 3-pole 3-zero (3P3Z) compensator, realized as a microcontroller, although it is noted that any other digital or analog compensator may be used. The compensator 14 is configured so that buck converter 9 provides a compensation voltage $U_{comp}$, which is of same value but of opposite polarity to $U_{drop}$, and thus offsets $U_{drop}$.

As will be further apparent from FIG. 2, instead of buck/boost converters 7a-7c used in the setup of FIG. 1, the present embodiment employs a combination of a second power converter, i.e., a switched-mode power supply, namely a boost converter 20, with dedicated downstream power converters 21a-21c, associated with the respective downstream ports 6a-6c. The boost converter 20 in this embodiment provides a fixed voltage $U_2$ with reference to potential IGND. Capacitor 12 stabilizes this voltage. It is noted that the virtual device ground IGND is also provided to the downstream power converters 21a-21c and the downstream ports 6a-6c.

The dedicated downstream power converters 21a-21c are buck converters and are arranged to reduce the voltage as required by respective USB devices (not shown), connected to the downstream ports 6a-6c. While three dedicated downstream power (buck) converters 21a-21c and associated downstream ports 6a-6c are illustrated, the communication device 4a may have more than, or less than, three converters and associated ports, depending on the application.

In the embodiment of FIG. 2, the load of the buck converter 9 in terms of electrical power is as follows:

$$P_{Buck} = P_{Load} * \frac{U_{comp}}{U_2 - U_{comp}},$$

where $P_{Load}$ is the power of the load, applied to the buck converter 9 by the downstream ports 6a-6c during use. The power of the load seen by the boost converter circuit 20 can in this case be expressed as:

$$P_{Boost} = P_{Load} * \frac{U_2}{U_2 - U_{comp}} \qquad (1)$$

Figure 3:
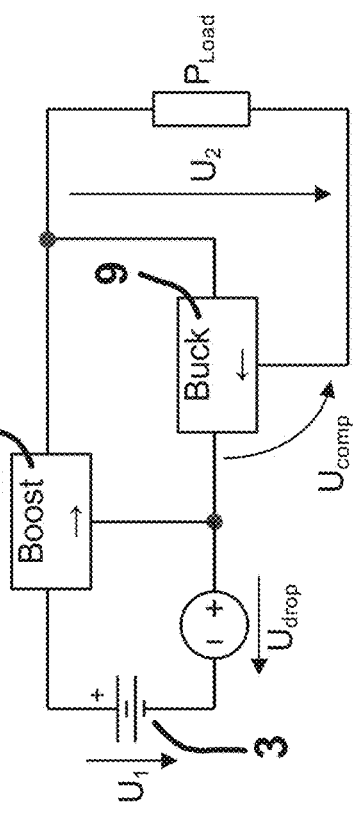
FIG. 3 shows an equivalent circuit diagram of the embodiment of FIG. 2.

An equivalent circuit diagram is shown in FIG. 3. As can be seen from the FIG., in this example, the ground terminal of the boost converter circuit 20 is not connected to the virtual device ground IGND, but connected to the ground of battery 3. For clarity, it is noted that the downstream power converters 21a-21c and associated downstream ports 6a-6c are shown in FIGS. 3 and 4 as a summarized load $P_{Load}$.

Figure 4:
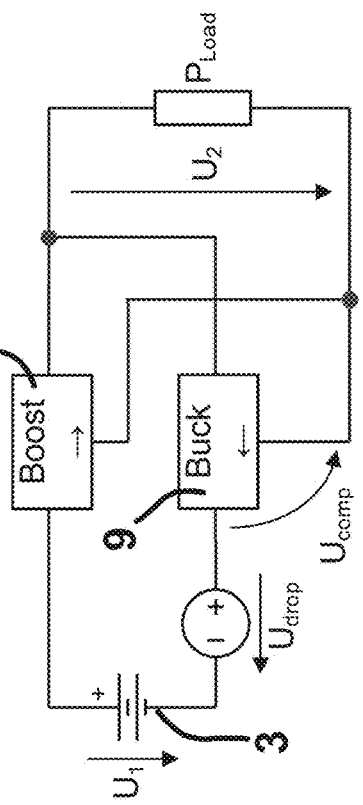
FIG. 4 shows an equivalent circuit diagram of another embodiment.

FIG. 4 shows a second embodiment in an equivalent circuit diagram, which illustrates a further topology option of connecting the buck converter 9 and the boost converter 20 of FIG. 2.

The load of the buck converter 9 in the arrangement of FIG. 4 can be expressed as:

$$P_{Buck} = P_{Load} * \frac{U_{comp}}{U_1 - U_{comp}} \qquad (2)$$

While the topology option of FIG. 4 may be applied to the setup, shown in FIG. 2, a comparison of the two preceding equations, i.e. eq. (1) and eq. (2) shows that the overall load of the buck converter 9 in the embodiment of FIG. 4 is higher, since the battery voltage $U_1$ in the denominator of eq. 2 is lower than the boost converter output voltage $U_2$ in eq. (1).

Accordingly, while the setup of FIG. 4 may provide a relatively simple setup, losses at the buck converter 9 may be somewhat higher, compared with the topology option of FIG. 3.

Figure 5:
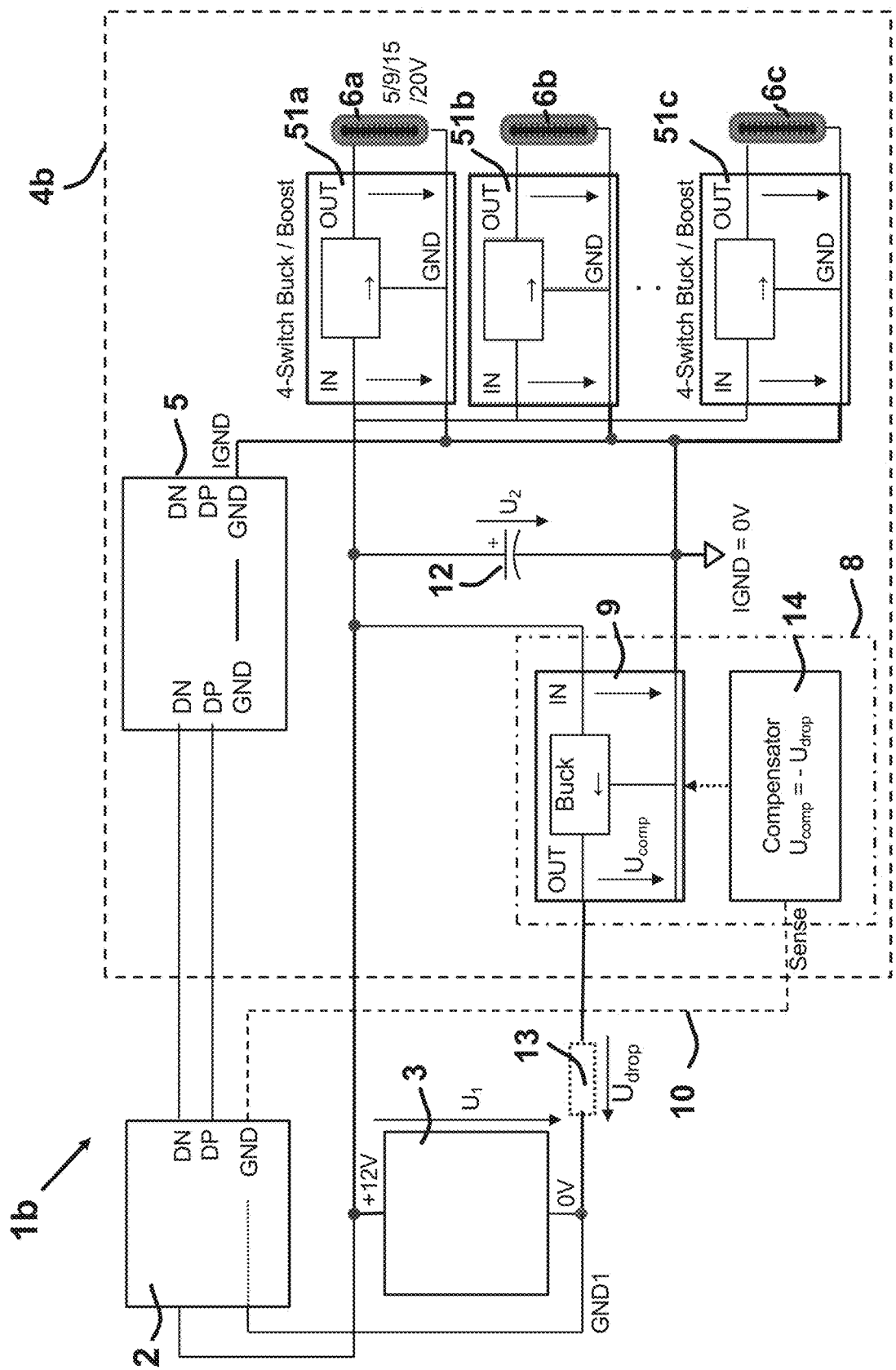
FIG. 5 shows an exemplary block diagram of another embodiment of a communication system and a communication device.

It is noted that the communication system 1a of FIG. 2 could be adapted to use buck/boost converters instead of the combination of boost converter 20 and the buck converters 21a-21c. A corresponding embodiment is shown in FIG. 5. The system 1b and communication device 4b of FIG. 5 corresponds to the system 1a and communication device 4a of FIG. 2, with the exception that the boost converter 20 has been removed and that instead of buck converters 21a-21c buck/boost converters 51a-51c, typically embodied by 4 switch converters, are used for all downstream ports 6a-6c.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measures cannot be used to advantage. Programming may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A communication device for connection with a power source and a host device, the communication device comprising:
    a device controller circuit for data communication with the host device;
    one or more downstream ports for connecting one or more respective devices, different from the host device; and
    a converter circuit to provide a virtual device ground at least to the device controller circuit and to the one or more downstream ports to compensate a ground potential difference between the host device, the device controller circuit, and the one or more downstream ports of the communication device; wherein
    the converter circuit comprises a compensator with a memory; wherein
    the compensator to retrieve from the memory pre-determined impedance data of a signal ground between the host device and the communication device and to control the virtual device ground based on the pre-determined impedance data so that the ground potential difference is reduced.

2. The communication device of claim 1, wherein the compensator to control the virtual device ground to match the ground potential of the host device.

3. The communication device of claim 1, wherein the converter circuit comprises a switched-mode power supply.

4. The communication device of claim 3, wherein the switched-mode power supply is a buck converter.

5. The communication device of claim 1, further comprising a second converter circuit, which second converter circuit for connection to the power source and to provide an internal supply voltage for the communication device.

6. The communication device of claim 5, wherein the internal supply voltage is higher than a voltage provided by the power source.

7. The communication device of claim 5, wherein the second converter circuit is a switched-mode power supply.

8. The communication device of claim 5, wherein the second converter circuit comprises a ground terminal, which ground terminal is not connected to the virtual device ground.

9. The communication device of claim 1, wherein the communication device is a USB device or a USB hub.

10. The communication device of claim 1, wherein the compensator to determine the pre-determined impedance data during power-on by measurement.

11. The communication device of claim 10, wherein during measurement, the compensator to draw current pulses from the power source to determine the pre-determined impedance data.

12. The communication device of claim 1, wherein the pre-determined impedance data is determined during assembly.

13. The communication device of claim 1, wherein one or more of the downstream ports have an associated downstream power converter.

14. The communication device of claim 13, wherein the downstream power converter is connected with the virtual device ground.

15. The communication device of claim 1, wherein for each of the downstream ports, a dedicated associated downstream power converter is provided.

16. The communication device of claim 1, wherein the compensator is a digital 3P3Z compensator.

17. A communication system comprising:
    a host device; and
    a communication device, the communication device for connection with the host device and with a power source, the communication device comprising:
    a device controller circuit for data communication with the host device;
    one or more downstream ports for connecting one or more respective devices, different from the host device; and
    a converter circuit to provide a virtual device ground at least to the device controller circuit and to the one or more downstream ports to compensate a ground potential difference between the host device, the device controller circuit, and the one or more downstream ports of the communication device; wherein
    the converter circuit comprises a compensator with a memory; wherein
    the compensator to retrieve from the memory pre-determined impedance data of a signal ground between the host device and the communication device and to control the virtual device ground based on the pre-determined impedance data so that the ground potential difference is reduced.

18. A method of communication in a communication system with a host device and a communication device, the method comprising:
    providing a virtual ground to a device controller circuit of the communication device and to one or more downstream ports, which downstream ports are for connecting one or more respective devices, different from the host device;
    retrieving from a memory pre-determined impedance data of a signal ground between the host device and the communication device;
    controlling the virtual ground based on the pre-determined impedance data so that a ground potential difference between the host device, the device controller circuit, and the one or more downstream ports of the communication device is reduced; and
    communicating between the host device and the communication device.

* * * * *